Jan. 31, 1950  A. E. DENTLER  2,495,922
FRICTION SHOCK ABSORBER
Filed Dec. 19, 1945  2 Sheets—Sheet 1

Inventor:
Arnold E. Dentler.
By Henry Fuchs.
Atty.

Jan. 31, 1950  A. E. DENTLER  2,495,922
FRICTION SHOCK ABSORBER
Filed Dec. 19, 1945  2 Sheets-Sheet 2

Inventor:
Arnold E. Dentler.
By Henry Fuchs
Atty.

Patented Jan. 31, 1950

2,495,922

UNITED STATES PATENT OFFICE 2,495,922

FRICTION SHOCK ABSORBER

Arnold E. Dentler, La Grange, Ill., assignor to W. H. Miner, Inc., Chicago, Ill., a corporation of Delaware Application December 19, 1945, Serial No. 635,898

5 Claims. (Cl. 267—9)

This invention relates to improvements in friction shock absorbers especially adapted for use in connection with railway car trucks for snubbing the action of the usual truck springs.

One object of the invention is to provide a friction shock absorber adapted to be substituted for one or more of the spring units of a cluster of truck springs of a railway car, comprising a pair of counterpart friction elements having sliding frictional engagement with each other and provided with follower members at the outer ends thereof, and a coil spring surrounding said elements and bearing at opposite ends on said follower members to yieldingly resist relative movement of the friction elements toward each other, wherein the parts are so proportioned and designed that the respective coils at opposite ends of the coil spring exert lateral inward pressure on the friction elements to press the same against each other into tight frictional engagement.

A further object of the invention is to provide in a shock absorber, as set forth in the preceding paragraph, means for holding the coil spring in proper position to effectively press the friction elements together into tight frictional contact with each other, comprising crowned or raised portions provided on the follower members on which the spring is supported and which compensate for slight inaccuracies found in the springs, which inaccuracies are unavoidable in manufacturing practices, such as the springs not standing perfectly vertical on their ends, or the ends not being parallel.

Other objects of the invention will more clearly appear from the description and claims hereinafter following.

Figure 1:
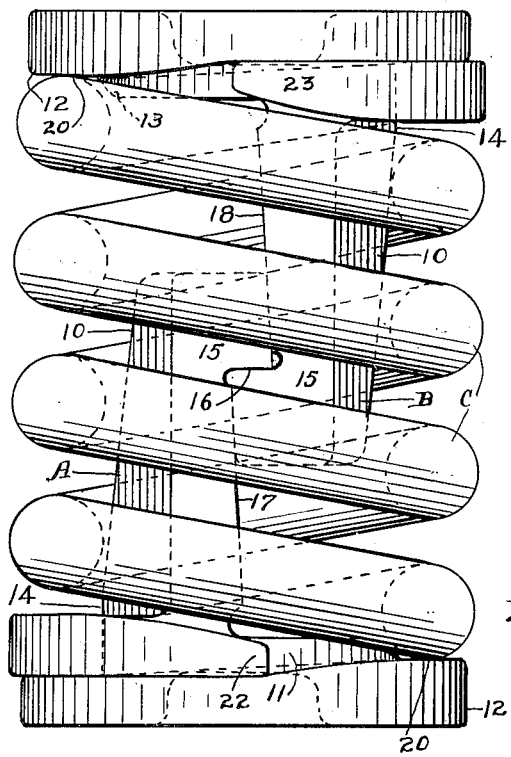
Figure 2:
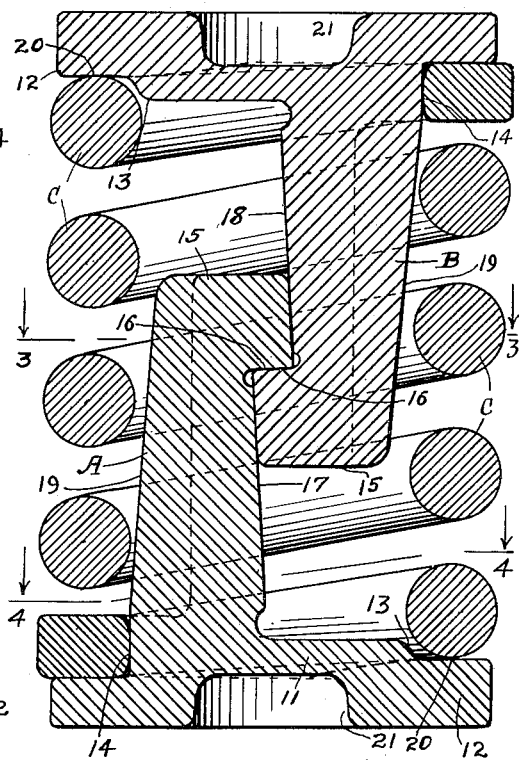
Figure 3:
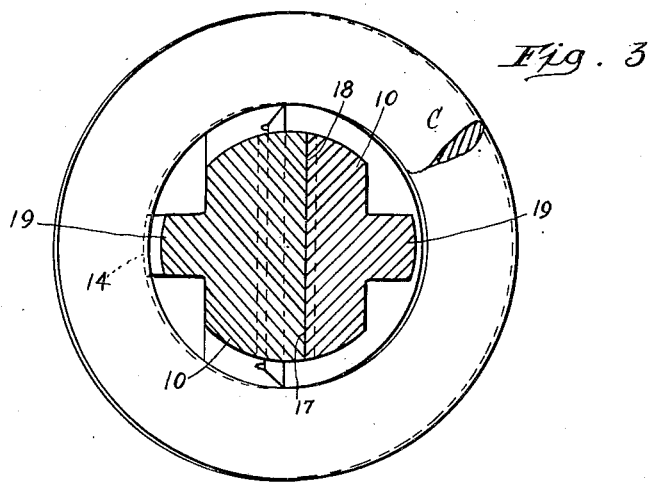
Figure 4:
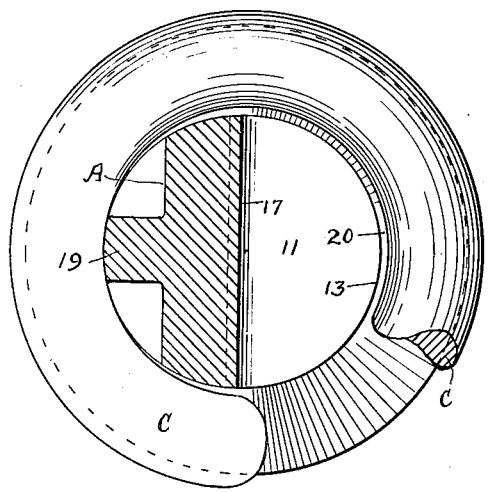
Figure 5:
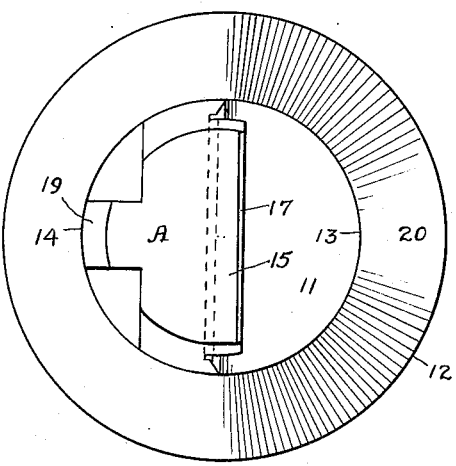
Figure 6:
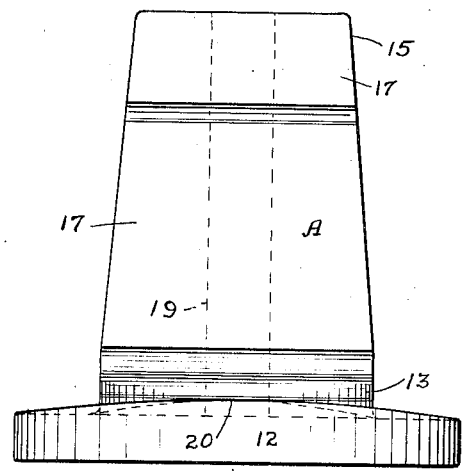

In the drawings forming a part of this specification, Figure 1 is a side elevational view of the improved shock absorber. Figure 2 is a transverse, vertical sectional view of the shock absorber shown in Figure 1, said sectional view being on a plane at right angles to the friction surfaces of the friction elements and coinciding with the central vertical axis of the device. Figures 3 and 4 are horizontal, sectional views, corresponding respectively to the lines 3—3 and 4—4 of Figure 2. Figure 5 is a plan view of one of the friction elements of my improved mechanism. Figure 6 is an elevational view of Figure 5, looking from right to left in said figure.

My improved shock absorber comprises broadly two counterpart friction elements or posts A and B, and a coil spring resistance C surrounding the elements or posts.

The friction elements or posts A and B are identical, but reversely arranged, the post B being inverted with respect to the post A. Each friction element or post comprises a vertically disposed, heavy plate 10 having a base portion 11 and a laterally extending, annular flange 12 projecting from said base portion 11, concentric to the vertical central axis of the device and forming a follower portion or member. The periphery 13 of the base portion is rounded and, at the outer side or back of the plate or post 10, presents a vertical abutment wall 14 of cylindrical contour for a purpose hereinafter described. As hereinbefore stated, the two identical posts A and B are reversely arranged, that is, the post A is disposed at the bottom of the device and has the plate 10 upstanding from the follower portion 12 thereof, and the post B is disposed at the top of the device and has the plate 10 thereof depending from the follower portion 12.

The free end portion of the friction plate 10 of each post is laterally inwardly enlarged, as indicated at 15, thereby providing a horizontal shoulder 16, the enlarged portion 15 of the post A being at the upper end thereof, as seen in Figures 1 and 2, and that of the post B being at the lower end thereof. The enlargements of the two posts overhang each other and the shoulders 16 thereof engage each other to limit vertical separation of the posts and hold the device assembled.

On the inner side, the friction plate 10 of each post has flat friction surfaces 17 and 18 offset with respect to each other, said friction surfaces being formed respectively on the inward enlargement 15 and the main body portion of said plate. The friction surface 17 of each post has sliding contact with the friction surface 18 of the other post. As clearly shown in Figures 1 and 2, the friction surfaces 17 and 18 of each post are inclined slightly with respect to the central vertical axis of the mechanism, that is, they are inclined to a vertical plane, the friction surfaces 17 and 18 of the post A being inclined outwardly away from said central vertical axis in upward direction, and the surfaces of the post B being inclined inwardly toward said vertical axis. The inclination of the friction surfaces of the two posts is the same so that these friction surfaces have flat face to face contact with each other.

The friction plate 10 of each post is preferably reenforced on its outer side by a lengthwise extending, central rib 19, which is continuous from the base portion 11 to the outer end of the friction plate. As shown in Figures 3, 4, and 5, the outer edge face of the rib is rounded off transversely to correspond with the curvature of the cylindrical wall 14 of the base portion 11 and merges with said wall 14. The rib 19 is preferably slightly inclined inwardly, the rib of the post A being inclined inwardly in upward direction and the rib of the post B being inclined inwardly in downward direction. Each post is thus, in effect, tapered toward its outer end.

At the friction surface side of each post, the flange 12 thereof, which forms the follower portion of said post, is thickened, as shown, to provide a crown 20, the crown 20 of the flange 12 of the post A being on the upper side of said flange and that of the flange 12 of the post B being on the lower side thereof. As shown, the crown 20 is in the form of a convex surface extending around the flange to an extent of approximately 180 degrees, and has a graduated rise, its apex being midway between the ends thereof. The flange 12 thus presents an inner surface which has raised and depressed portions which are at diametrically opposite sides of the post. In the assembled condition of the device, the crowns of the respective posts A and B are at diametrically opposite sides of the device, the crown of the follower portion of the post A being at the right hand side, as shown in Figures 1, 2, 3, and 4, and that of the follower portion of the post B being at the left hand side.

The base portion of each post is further provided with an outwardly opening pocket or seat 21 adapted to receive the usual spring centering projection of the corresponding spring follower plate of the truck spring cluster of a railway car.

The spring C is in the form of a helical coil made from a bar of circular cross section having its ends flattened to form tangs 22 and 23. The spring C is so designed that the tangs thereof terminate 180 degrees apart, that is, they are located at diametrically opposite sides of the spring. The finished spring C has the top and bottom ends flattened, that is, each tang is displaced inwardly with respect to the adjacent coil which it overlies. The amount of displacement is such that the spring will not lean appreciably when placed on end. This helical coil spring C surrounds the posts A and B and bears at its top and bottom ends on the top and bottom follower members 12—12 of the posts and is so positioned that the respective tangs thereof are seated on the depressed portions of the inner surfaces of the flanges 12—12 with the extremity of each tang adjacent the crown 20 of the corresponding follower member, and the adjacent coil of the spring beyond the end of said tang seated on the crown. The crowns 20—20 of the posts A and B thus fill in the so-called "low spots" at the opposite ends of the coiled spring.

The interior diameter of the coiled spring C and the spread of the contacting friction posts are such that the inner sides of the top and bottom coils of the spring bear laterally inwardly on the vertical walls of the base portions 11 of the posts, that is, the inner side of the coil at the upper end of the spring bears on the wall 14 of the base member 11 of the post B at the right hand side of the device, and the coil at the lower end of the spring bears on the wall 14 of the base member 11 of the post A at the left hand side of the device, as seen in Figure 1, the spread of the posts being such that the upper end portion of the spring is displaced slightly to the right and the lower end portion thereof slightly to the left. At the side of the base portion of each post opposite to that contacting the inner side of the coil of the spring, substantial clearance is provided between the side edge of the base 11 and the inner side of said spring to assure proper functioning of the latter in pressing the posts against each other. The spring C is preferably under initial compression.

In assembling the mechanism, the spring C is first placed over the plate 10 of the post A. The post B is then assembled with the other parts by inserting the friction plate 10 of the same downwardly within the coils of the spring, the posts A and B being held in tilted position away from each other, so that the enlargements 15—15 thereof will pass each other. This tilting movement of the posts within the spring is permitted by the clearance provided, due to the taper of the ribbed portions of the posts. The parts are forced together until the shoulders 16—16 pass each other, whereupon the shoulder of the post B will snap under the shoulder of the post A, thereby locking the posts together against lengthwise separation.

The improved shock absorber preferably replaces one or more of the spring units of a truck spring cluster, being interposed between the usual top and bottom spring plates which cooperate with said cluster, however, several of such shock absorbing units may be employed in a single spring cluster, replacing two or more units of the latter.

The operation of my improved shock absorber is as follows: Upon the spring cluster of the truck of a railway car being compressed between the spring follower plates of said cluster, the shock absorbing unit, which is disposed between said follower plates, is compressed therewith, thereby forcing the post B downwardly toward the post A against the resistance of the spring C. Due to the inclination of the cooperating friction surfaces thereof, the posts are forced laterally outwardly during relative lengthwise movement of the same, thereby spreading the device laterally. This spreading action, being resisted by the spring C, causes the friction surfaces of the posts to be pressed more tightly together. At the same time, due to the relative lateral displacement of the parts, a canting action of the spring is produced which causes the coil at the lower end of said spring to be forced laterally against the cylindrical base portion of the post A at the left hand side of the device and the coil at the upper end of the spring to be forced laterally against the cylindrical base portion of the post B at the right hand side of the device, thereby further pressing together the friction surfaces of said posts. During relative lengthwise movement of the posts on their friction surfaces, during compression of the mechanism, the required frictional resistance is developed to effectively snub the action of the truck springs. Upon release of the mechanism, the posts A and B are restored to the normal position shown in Figures 1 and 2 by the expansive action of the spring C, longitudinal separation of the posts being limited by engagement of the shoulders 16—16 of the posts with each other. As will be evident, frictional resistance is also had during this releasing action to effect snubbing of the truck springs during recoil.

I claim:

1. In a friction shock absorber, the combination with a pair of relatively lengthwise slidable friction posts having interengaging friction surfaces on the inner sides thereof; of annular follower members at the outer ends of the posts, each follower member having an annular abutment surface at its inner side, which, at one diametrical side of said follower, lies in a plane at right angles to the central longitudinal axis of the device, and is raised at the opposite diametrical side of said follower to provide a crown, the crowns of said follower members being respectively at diametrically opposite sides of the device; and a coil spring surrounding said posts and yieldingly opposing relative approach thereof lengthwise of the device, said spring bearing on said abutment surfaces of said followers and the crests of the crowns thereof.

2. In a friction shock absorber, the combination with a pair of relatively lengthwise slidable friction posts having interengaging friction surfaces on the inner sides thereof; of annular follower members at the outer ends of the posts, each follower member having an annular abutment surface on its inner side, which, at one diametrical side of said follower, lies in a plane at right angles to the central longitudinal axis of the device and is raised on the opposite diametrical side of said follower to provide a crown, the crowns of said followers being at the friction surface sides of the corresponding posts; and a coil spring surrounding said posts and yieldingly opposing relative approach thereof lengthwise of the device, said spring bearing on said abutment surfaces of the followers and the crowns thereof.

3. In a friction shock absorber, the combination with a pair of relatively lengthwise slidable friction posts having interengaging friction surfaces on the inner sides thereof; of an annular follower member at the outer end of each post, having an annular abutment surface on its inner side, said surface, at one diametrical side of said follower, lying in a plane at right angles to the longitudinal central axis of the device and presenting a rounded raised portion at the diametrical opposite side to provide a crested crown; and a helical coil spring surrounding said posts and bearing at opposite ends on said annular abutment surfaces of said follower members and the crests of the crowns thereof, the tangs at opposite ends of said spring being seated on said surface portions of the followers which lie in planes at right angles to the longitudinal axis of said device.

4. In a friction shock absorber, the combination with a pair of relatively lengthwise slidable friction posts having interengaging friction surfaces on the inner sides thereof; of an annular follower member at the outer end of each post having an annular abutment surface on its inner side having a portion, at one diametrical side of the follower, lying in a plane at right angles to the longitudinal central axis of the device, and having the surface portion at the diametrical opposite side thereof elevated and rounded to provide a crown, said crown being at the friction surface side of the corresponding post; and a helical coil spring surrounding said posts and bearing at opposite ends on said followers, said spring being positioned with the tangs thereof clear of the crowns of said followers.

5. In a friction shock absorber, the combination with a pair of relatively lengthwise slidable friction posts having interengaging friction surfaces on the inner sides thereof; of an annular follower member at the outer ends of each post having an annular abutment surface on its inner side having a portion thereof lying in a plane at right angles to the longitudinal central axis of the device, and another portion thereof offset outwardly with respect to said plane to provide a crown projecting toward the other follower, said crown being at the friction surface side of the corresponding post; and a helical coil spring surrounding said posts and bearing at opposite ends on said followers, the crowns of said followers being entirely clear of the tangs of said spring and beyond the ends of said tangs.

ARNOLD E. DENTLER.

REFERENCES CITED

The following references are of record in the file of this patent:

UNITED STATES PATENTS

| Number | Name | Date |
|---|---|---|
| 709,999 | McCord | Sept. 30, 1902 |
| 1,404,464 | Meyer | Jan. 24, 1922 |
| 1,595,317 | Scholey | Aug. 10, 1926 |
| 2,410,160 | Haseltine | Oct. 29, 1946 |
| 2,410,165 | Johnson et al. | Oct. 29, 1946 |